Aug. 7, 1934.  L. A. JONES  1,969,465
MEANS FOR MAINTAINING MOVING BANDS IN SYNCHRONISM
Filed July 29, 1932   3 Sheets-Sheet 2
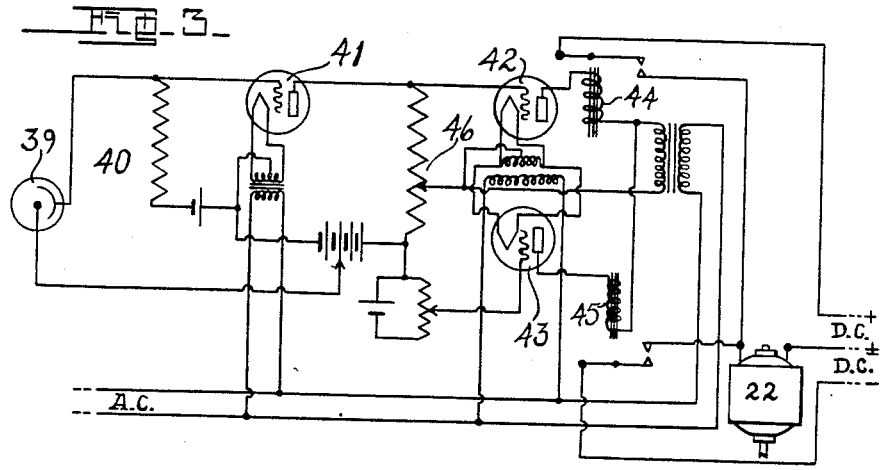
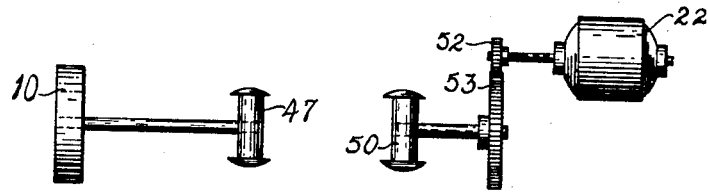
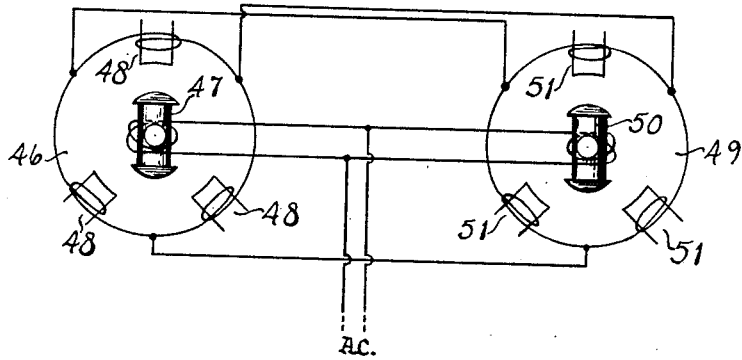
Inventor
Loyd A. Jones
By Newton M. Perrins
Rolla H. Carter Attorneys Aug. 7, 1934.   L. A. JONES   1,969,465
MEANS FOR MAINTAINING MOVING BANDS IN SYNCHRONISM
Filed July 29, 1932   3 Sheets-Sheet 3
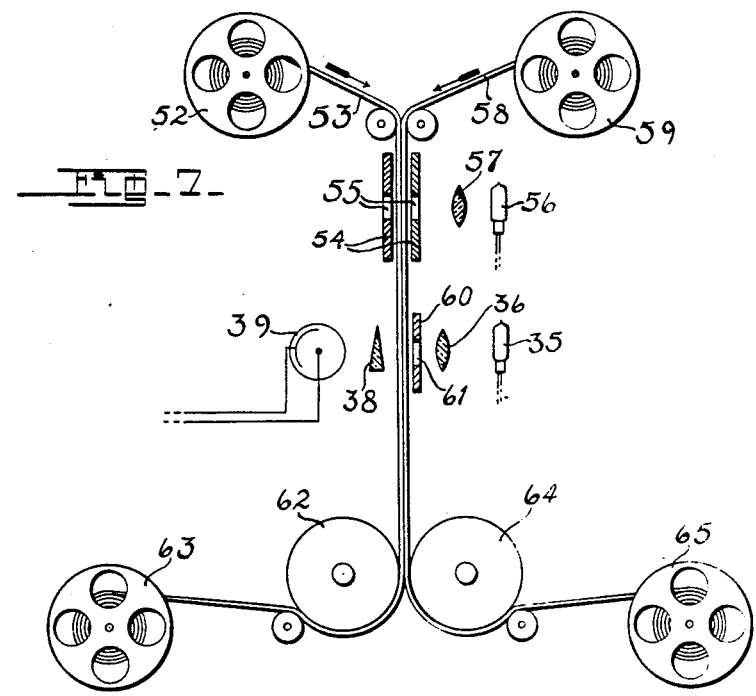
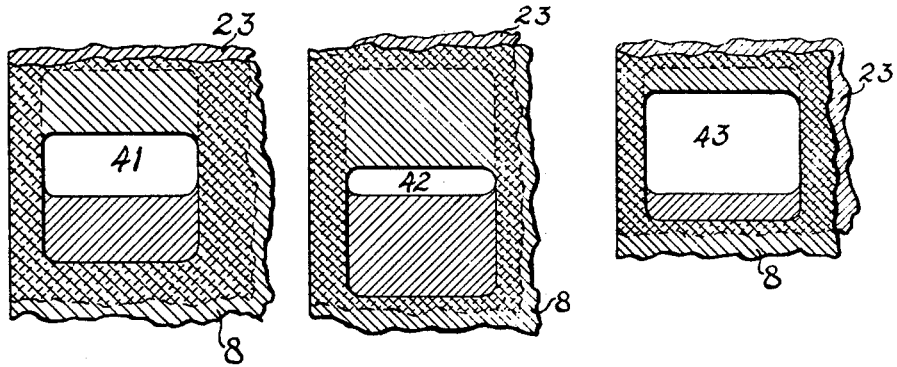
Inventor
Loyd A. Jones Patented Aug. 7, 1934

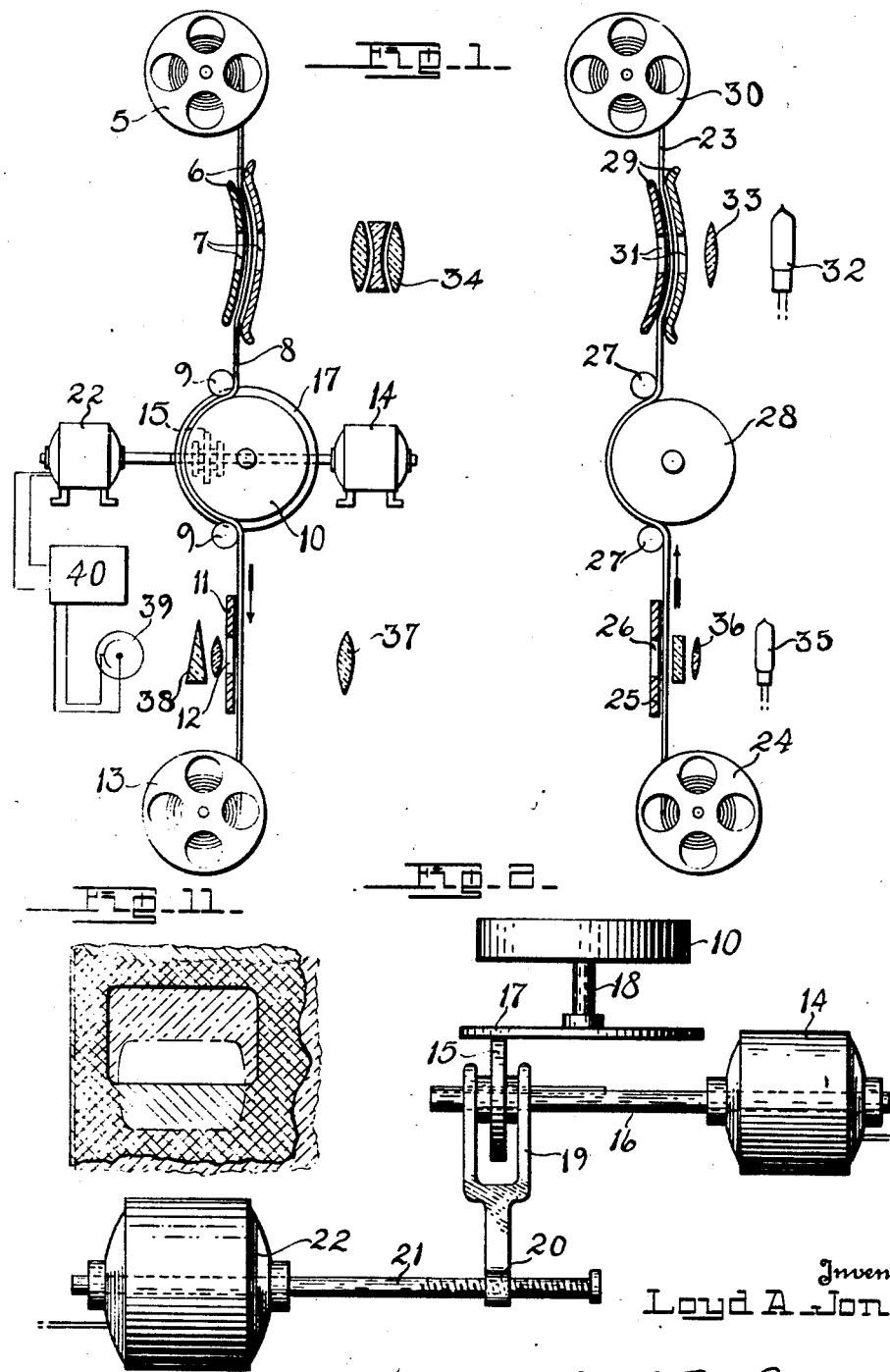

1,969,465

UNITED STATES PATENT OFFICE 1,969,465

MEANS FOR MAINTAINING MOVING BANDS IN SYNCHRONISM

Loyd A. Jones, Rochester, N. Y., assignor to Eastman Kodak Company, Rochester, N. Y., a corporation of New York Application July 29, 1932, Serial No. 625,693

5 Claims. (Cl. 88—24)

This invention relates to a method and apparatus for maintaining synchronism between moving bands such as motion picture films.

It has been found that where sound is photographically recorded on a record or film any irregularity in the movement of the film may result in the loss or distortion of a portion of the sound record to be printed. In attempting to advance motion picture films through a printing device by sprocket drive it frequently happens that the sprockets produce undesirable irregularities of motion and it is therefore proposed to move such films by means of smooth cylinders or rollers without teeth. When this is done it is difficult to maintain proper relationship between two films which are being moved in this manner. For instance in making a print on freshly perforated film from a negative which has been processed and therefore slightly shrunken, the precise relationship between the picture areas is not maintained since the perforation spacing on the two films is slightly different. The mentioned shrinkage in the negative film may amount to as much as ten or more feet in each thousand feet so that if sound record prints are made by a mechanism in which the two films are moved at a continuous linear velocity by means of rollers, the sound record tends gradually to go out of synchronism with respect to the picture record. For this reason it is desirable in many cases to maintain a synchronism based on the number of perforations rather than upon the linear length of the film.

In accordance with the present invention a novel method has been devised in which photoelectric control maintains two film bands in desired synchronous relation. A further feature of the invention resides in the method of maintaining synchronism between two moving perforated film bands which comprises utilizing the variation from a super-imposed relation of the perforations of the two bands to control the velocity of movement of one or of both of them. A further feature of the invention includes the novel equipment for maintaining the positive and negative films in synchronism while they are being advanced through a printer. Other features will appear from the detailed description and claims.

The present invention can best be understood by reference to the drawings in which Fig. 1 is a diagrammatic showing of the important parts of a projection printing device for printing photographic films; Fig. 2 is a plan view of a unit for mechanically regulating the speed of a drum for driving either the positive or negative; Fig. 3 is a circuit diagram including a photoelectric cell and associated equipment which controls the operation of the unit of Fig. 2; Fig. 4 is a modified form of electrical control unit which may be substituted for the unit shown in Fig. 2; Figs. 5 and 6 show side views of certain of the elements shown in end view in Fig. 4; Fig. 7 shows the invention applied to a contact type of printer; and Figs. 8, 9 and 10 show the positive and negative films in superimposed relation with the perforations thereof in various degrees of registry, while Fig. 11 shows 16 millimeter positive film in superimposed relation with respect to 35 millimeter film.

Referring especially to Fig. 1 there is shown a supply reel 5 from which the positive film 8 is advanced by means of the rollers 9 and the driven drum 10 through the gate elements 6 and past a diaphragm 11 provided with a slit 12, to a take-up reel 13. The drum 10 as shown in Fig. 2 is driven from a constant speed motor 14 by means of a disc 15, rotated by the motor shaft 16, which disc engages the face of a plate 17 mounted on shaft 18 of the drum 10.

The disc 15 rotates with the shaft 16 but is adjustable longitudinally of the shaft by means of the fork-shaped member 19 which terminates in a threaded portion 20. This threaded portion engages the threaded part of the shaft 21 of a reversible motor 22 so that by rotating the shaft 21 in one direction or the other the fork member 19 moves the disc 15 to engage a different portion of the face of the plate 17 so that the velocity of the drum 10 may be changed.

The negative film 23 as shown in Fig. 1 is advanced from a supply reel 24 past a diaphragm 25 provided with a slit 26 by the rolls 27 and the driven roll 28, between the elements 29 of well-known gate mechanism, to the take-up reel 30. The gate elements 29 are provided with apertures 31 in the optical path of rays from the source of light 32 passing through the condenser lens 33, the projection lens unit 34 and the openings 7 in gate elements 6. It will be noted that both the positive and negative films are driven by rollers without teeth in contrast to the usual sprocket drive used in such printers. The drum 28 may be driven from any constant speed motor while the drum 10 is variably driven from the constant speed motor 14 by means of the variable speed mechanism shown in Fig. 2.

In the present arrangement synchronism is based on the number of perforations on the margin of the positive and negative films rather than upon the linear length of the film and this is effected by means of perforation matching which governs the relation of the two films under control of equipment to be described. The slits 12 and 26 in diaphragms 11 and 25 are so positioned that light from the source 35 passes through the condenser lens 36, the perforated margin of the film 23, the lens 37, thence through the perforated margin of the film 8, and finally through the slit 12 and a rectifying element 38 to the photoelectric cell 39. The rectifying element 38, which is assumed to be a rotating annular ring prism driven at the same speed as the drum 10, functions to maintain at a fixed position on a photoelectric cell, the images of the perforations in the moving films. It will be understood, however, that any of the well-known rectifying elements such as rotating mirrors, oscillating mirrors or prisms may be used for the purpose of maintaining these images on a desired portion of the photoelectric cell. Mention has been made in the foregoing description that the reversible motor 22 is utilized to control the speed at which the drum 10 is driven from constant speed motor 14. The motor 22 is controlled in turn by a photoelectric cell and an amplifier relay network generally designated 40 which is shown in detail in Fig. 3. The photoelectric current developed by the photoelectric cell 39 is amplified by a vacuum tube 41 of the network 40, the output of which vacuum tube is linked to the input of two vacuum tubes 42 and 43 connected in the well-known push-pull arrangement.

The output circuit of the vacuum tube 42 includes an electromagnet 44 which controls a circuit leading to the motor 22 for causing this motor to rotate in one direction while the output of the vacuum tube 43 includes another electromagnet 45 which controls another circuit leading to the motor 22 by which it is caused to rotate in the opposite direction. The potentiometer 46 serves as a means of adjustment to prevent both relays 44 and 45 operating at the same time.

With this description of the equipment, it will now be explained how the perforation matching on the positive and negative films is utilized to maintain these films in synchronism. In Figs. 8, 9 and 10 there are represented three possible positions of perforation matching. In Fig. 8 one edge of the film 23 bisects the perforation in the film band 8. This may be considered the normal position and the relationship between the two films which it is desired to maintain. If now we assume that the film band 23 is moving too slowly after the lapse of a certain time, the two perforations will appear relative to each other as shown in Fig. 9 so that there is a very narrow opening 42 through which the radiations may pass. On the other hand if the film band 23 is moved too rapidly the relation of the two films will be that indicated in Fig. 10 in which case a larger area 43 for the transmission of radiations through the superimposed perforations, results. If now light from the source 35 be concentrated on the moving films by the lens 36, more or less light will be transmitted by the two film bands depending on which of the conditions shown in Figs. 8, 9 and 10 exists. For instance in the position of the films represented in Fig. 8 a certain light flux or radiation flux is transmitted which is directly proportional to the unshaded area and therefore proportional to one-half the perforation area.

In Fig. 9 the overlapping of the films is such that a much smaller amount of radiation represented by the unshaded area 42 is transmitted while in the position shown in Fig. 10 the unshaded area 43 transmits more radiations than in case illustrated in Fig. 8. This transmitted radiation falls upon the sensitive surface of the photoelectric cell 39 and the photoelectric current developed thereby, amplified by the amplifier 40, is utilized to control either the electromagnet 44 or the electromagnet 45 to rotate the motor 22 either clockwise or counterclockwise to position the disc 45 on the proper portion of the face of the plate 17 so that the constant speed motor 14 drives the film-advancing drum 10 at the desired variable speed. Thus the overlapping of the perforations in the positive and negative film bands is used to control the linear velocity of one of these bands in such a manner that a constant overlapping between corresponding perforations on the two film bands is maintained. In this way almost exact synchronism is preserved between the positive and negative films.

In the foregoing arrangement the varying photoelectric current is utilized to control the speed at which the advancing drum 10 for the film is variably driven from a constant speed source. In the arrangement shown in Figs. 4, 5 and 6 variable, electrical speed control equipment is shown which may be substituted for the mechanical speed control equipment shown in Fig. 2. In Fig. 4 there is diagrammatically represented a motor unit which has been described in The Transactions of Society of Motion Picture Engineers Vol. XII, No. 35, beginning on page 778. This motor unit comprises an induction motor generally designated 46 having a rotor 47 energized from a single phase alternating current source and stator elements 48, each energized from a different phase of a three-phase alternating current source. The control element of this unit includes a second motor 49 provided with a rotor 50 energized in parallel with the rotor 47 from the single-phase alternating current source while the stator elements 51 of this motor are each likewise energized from a different phase of the three-phase alternating current source. It is unnecessary to explain the theory of this motor unit but it is sufficient to state that while the rotor 50 is being moved in one direction thereby changing its relation with respect to the stator elements 51 the speed of the motor 46 is increased whereas while the rotor 50 is being turned in the opposite direction changing its relation with respect to the stator elements 51 in the opposite sense, the speed of the motor 46 is decreased. In effecting the acceleration or retardation of the motor 46 the motor 22 shown in the circuit diagram of Fig. 3 is utilized. The shaft of this motor through the medium of the speed reduction gears 52 and 53 (Fig. 5) turns the rotor 50 either in one direction or the other to change its relation to the stator elements 51 and thereby change the speed of the motor 46. It will be noted from Fig. 6 that the rotor 47 is connected to the same shaft as the drum 10 which serves to advance the film 8 through the printer.

It will be understood that with the proper optical system 34 the negative may be 35 millimeter film and the positive 16 millimeter film or these dimensions of these films may be reversed or both films may be of the same width. In case 35 millimeter film is used for the negative and 16 millimeter film for the positive the overlapped portions of the film are represented in Fig. 11. In this case however the control of the speed is effected in the same manner as described by the overlapping of the films represented in Figs. 8, 9 and 10.

In Fig. 1 a projection printer has been disclosed but the invention is equally applicable to a contact printer such as shown in Fig. 7. In this case the negative film on the supply reel 52 is advanced through the gate elements 54 having apertures 55 illuminated by the light from source 56 passing through the lens 57 while the positive film 58 from the supply reel 59 similarly passes in contact with the negative through these gate elements. These two films while still in contact are advanced past a diaphragm 60 having an aperture 61 forming a part of the speed-controlling device, the negative film being advanced by the drum 62 driven at a variably controlled speed, to a take-up reel 63 while the positive 58 is advanced to the take-up reel 65 by the drum 64 driven at constant speed. The control of the speed of the drum 62 which may be driven in the same manner as the drum 10, represented in Fig. 2 or the corresponding drum represented in Fig. 6, may be effected by the mechanical speed-control unit of Fig. 2 or the electrical speed-control equipment of Fig. 4. In either case, however, the variable speed of the drum 62 is controlled, as previously described, by the varying overlap of the perforations of the positive and negative films which is utilized to variably affect the photoelectric cell 39 under the control of the light source 35, the lens 36 and the rectifying element 38.

It will be understood that the radiations from source 35 should be of such character that they are absorbed by the base and emulsions of the positive and the negative film while they are actinic to the surface of the photoelectric cell 39.

The present disclosure is for purposes of illustration only and it will be recognized that there may be many modifications and variations thereof without departing from the present invention.

What I claim is:

1. The method of maintaining two moving perforated bands in synchronism which comprises moving one of said bands at a substantially constant speed, moving the second band at a variable speed transmitting radiations through the corresponding perforations of both of said bands, translating the variable transmitted flux determined by the varying overlap of said perforations into an electric current, and employing said electric current to control the speed of movement of said second band.

2. The method of maintaining two perforated bands in synchronism which comprises moving one of said bands at constant speed, moving the second band at a variable speed from a constant speed source, transmitting radiations through corresponding perforations of said bands, and employing variable transmitted radiation flux determined by the varying overlap of said perforations to control the translation of said constant speed from said source into variable speed for driving the second band.

3. The method of maintaining two moving bands in synchronism which comprises moving one of said bands at a constant speed, moving the second band at a variable speed from a constant speed source, transmitting radiations through corresponding perforations of said bands, translating the variable transmitted radiation flux determined by the varying overlap of said perforations into a photoelectric current, and employing said photoelectric current to translate constant speed from said source into variable speed for driving said second band.

4. In combination with a device for printing perforated photographic film having means for advancing positive film and means for advancing negative film, a source of radiations, means for transmitting said radiations through corresponding perforations of said films, and means controlled by the variation in radiations transmitted through said perforations for controlling the speed of advancement of one of said films.

5. In combination with a device for printing perforated photographic film having means for advancing a positive film and means for advancing a negative film, a source of radiations on one side of said films, a radiation sensitive device on the other side of said films in position to intercept radiations from said source through said perforations, and means controlled by said radiation sensitive device for controlling the speed of advancement of one of said films.

LOYD A. JONES.